SCANNING TYPE IMAGE TRANSDUCER TELEVISION TUBE

Filed June 2, 1965

KLAUS J. HECKER
MARVIN P. NORDSETH
HORACE M. JOSEPH
INVENTORS

BY J. M. St. Amand
ATTORNEY

United States Patent Office 3,355,616
Patented Nov. 28, 1967

3,355,616
SCANNING TYPE IMAGE TRANSDUCER TELEVISION TUBE

Klaus J. Hecker, Oberursel, Germany, and Marvin P. Nordseth, Corona, and Horace M. Joseph, Riverside, Calif., assignors to the United States of America as represented by the Secretary of the Navy Filed June 2, 1965, Ser. No. 460,606
4 Claims. (Cl. 313—65)

ABSTRACT OF THE DISCLOSURE

An image dissector having transient storage using an image intensifier and a smoothing amplifier for continuous reception of any random bursts or continuous streams of impinging electrons and continuous self discharging of same over a time interval independent of external cycling voltages permitting efficient random readout of different parts of the image area.

The invention herein described may be manufactured and used by or for the Government of the United States of America for governmental purposes without the payment of any royalties thereon or therefor.

This invention relates to television imaging tubes and more particularly to a scanning type image transducer for a wide range of light levels.

Several different types of electronic imaging tubes are presently used in television cameras; for example, vidicons, image orthicons, and image dissectors. However, some of their main disadvantages are their large size and lack of sensitivity.

In most prior image tubes, light impinging on the photosensitive surface causes accumulation of charges on a storage device, and this charge is then drained off via an electron beam which is scanning the storage device. The prior art devices are concerned with ways of erasing the charge storage before further storage could be performed.

In the instant invention often called an image dissector these problems are solved by using a continuously disappearing electronic or light type image. A smoothing amplifier in the present invention smooths randomly large bursts of electrons separated by random intervals received from an image intensifier to a somewhat continuous stream of electrons averaged for a given time period. It permits continuous reception of any impinging electrons and the smoothed electrons are then emitted over a period of time that does not depend on any external cycling voltage. However an external voltage or radiation may be used to vary the smoothing or delay time. In effect, the heart of this invention consists of providing a diminishing storage that is continuously self discharging rather than a regular storage that is periodically discharged and then has to start integration anew.

Advantages that make leaky storage desirable are in applications where the information rate must be continuous, and there must be complete freedom as to the part to be scanned. It is desirable to scan only a small part of the raster by means of changing the scan pattern randomly without the undesirable effects of uneven erasure which occur in prior art devices; and also where the information rate must be continuous and it is desirable to have several independent output leads which continuously monitor different parts of the image area.

This invention permits the use of an image dissector type of readout of picture information, but it gives this tube the advantage of a low light level sensitivity. Most of the information in an image dissector is not used. Hence in this device it is possible to utilize multiple apertures and perform some data processing operations directly. It is also simple to operate since it requires no interacting electrode voltages, and it has a wide range of sensitivity. The tube may be made smaller in physical dimensions than tubes heretofore and therefore is rugged.

It is an object of the invention to provide a new and improved scanned imaging tube.

Another object of the invention is to provide a scanning type image transducer which permits continuous reception of any impinging electrons, smoothing the electrons and emitting them over a period of time that does not depend on any external cycling voltages.

Another object of the invention, as compared to other image tubes that integrate the signal and then require a beam discharge (such as the image orthicon) is that it permits scanning of just any part of the input image without an undesirable change in sensitivity whenever the scan moves to a new area.

A further object of the invention is to provide a scanned imaging tube having a diminishing or transient storage that is a true storage and will accomplish smoothing.

Other objects and many of the attendant advantages of this invention will become readily appreciated as the same becomes better understood by reference to the following detailed description when considered in connection with the accompanying drawings wherein.

Figure 1:
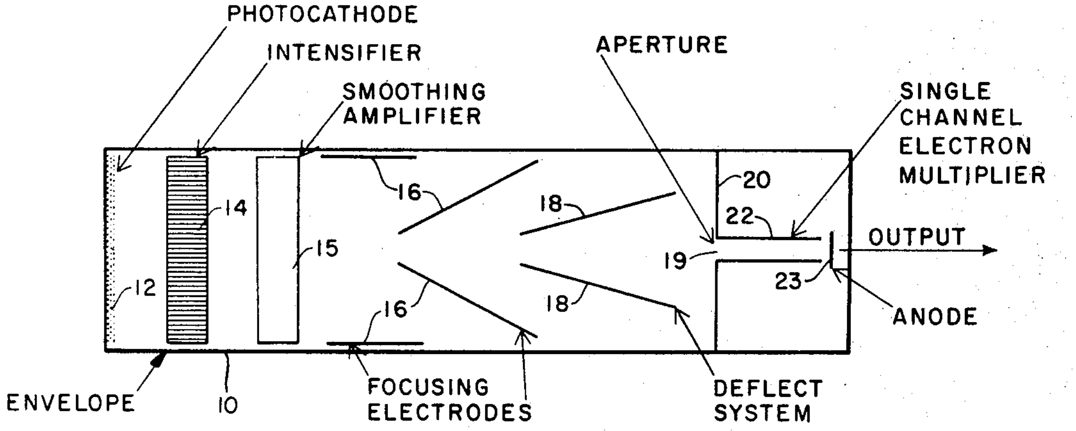
FIG. 1 is a diagrammatic sketch of a scanned imaging tube showing one embodiment of the invention.

FIG. 1, showing one possible form of the invention, consists of an evacuated envelope 10, of glass or the like, having mounted at one end thereof a photocathode 12 that emits electrons from each small element of area in proportion to the number of photons impinging upon that area. An image intensifier 14 is positioned following photocathode 12 and multiplies the number of electrons emitted from the photocathode. A smoothing amplifier 15, involving a diminishing storage means follows intensifier 14. An electrostatic electron image focusing electrode 16 projects the electron image from the photocathode, image intensifier and smoothing amplifier through an electrostatic deflection system 18 to readout aperture 19 in plate 20. The electrons that pass through aperture 19 are again multiplied by an electron multiplier 22, and are collected on an anode 23.

A pattern of light applied to photocathode 12 is converted into a corresponding distribution of electrons by photoelectric emission. This electronimage is enhanced in electron density by passing each portion of the image, for example through a tubular channel of a channel type intensifier 14. The signal is then stored in smoothing amplifier 15 to provide an even flow, which when projected, i.e., accelerated through the focusing field of focusing electrode 16 upon plate 20 containing readout aperture 19. The portion of the image sampled by aperture 19 is changed by moving the focused image across the aperture. The energy derived from the electron beam is further increased in the electron multiplier 22 and then applied to an output video circuit via anode 23.

Photocathode 12 is a conventional photoemissive surface. Image intensifier 14 is a well-known-channel intensifier, although of comparatively recent development, that uses secondary emission to increase the electron number by accelerating them into a number of small tubular channels. When the electrons impinge upon the channel walls, the energy is sufficient to cause a number of electrons to be released for each initial impinging electron. The enhanced number then appear at the smoothing amplifier 15 which in one from consists of a phosphor excited by the energy of the electrons placed close to a second photoemissive surface. (The smoothing amplifier is also called an emitting smoothing target and a Multiplying Emitting Electron Time (MEET) disperser.) The light energy emitted by the phosphor causes electrons to be emitted by a second photo-sensitive surface (photocathode) which forms the electron image focused and deflected toward the pickup aperture 19. (The channel intensified tubes are very small and hence block the phosphor light; in consequence undesirable feedback of this light toward the first photoemissive surface 12 is prevented.) The phosphor material is chosen to be one that continues to glow for an appreciable but short time after it has been excited.

The great advantage of the time averaging obtained in the phosphor is the smoothing of fluctuations in the number of photons arriving from the optical image during each successive time interval. The smoothing amplifier is like a video pulse stretcher in that the presence of each input event is stretched in time so that it can be detected at a later time and not lost. Consequently, there is an increase in signal-to-noise ratio with a resulting increase in effective sensitivity. A calculation of the signal-to-noise ratio for the scanned imaging tube is discussed later.

The scanned imaging tube can both be focused and deflected magnetically, by well-known means, instead of electrostatically by focusing system 16 and deflection system 18; or either one of these two functions could be performed magnetically.

Photocathode 12 can be such that it is sensitive in the ultra-violet, visible, and/or in the infrared region of the electromagnetic radiation spectrum to suit the desired use for the tube.

Also, intensifier 14 can be a channel multiplier, cascaded thin transmission films, cascaded phosphor-photocathode sandwich, or one of a number of other suitable types of intensifiers. The overall photon-electron gain can be low, medium or high enough so that the sensitivity of the overall tube is limited only by photocathode noise or the quantum fluctuation of the incident light photons.

Smoothing amplifier 15 can be combined with the electron multiplier above or be a surface film that has a finite delay such as a semi-conductor film used as a transmission element; this will also permit the desired storage. It can also be a multiple layer sandwich such as used in photoconductive-electroluminescent optoelectronic logic arrays.

The electron deflection system 18 can be connected to any appropriate raster deflection generator such as a TV raster, circular scan or crosshair deflection generator.

Figure 3:
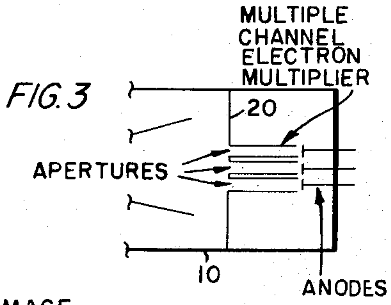
FIG. 3 shows a modification of device of FIG. 1 using multiple readout apertures.

Readout aperture 19 can be of any shape, such as round, square, rectangular or numerical as desired. The aperture 19 and multiplier 22 can also be replaced by several apertures and respective electron multipliers for effecting simultaneous multiple readout, as shown in FIG. 3. Such measures can further enhance sensitivity by permitting better electrical circuit frequency optimization, in addition to facilitating other circuit operation, such as auto-correlation that usually requires external storage.

Also, the single channel electron multiplier 22 can be replaced by a series of discrete amplifying dynodes or other amplifying system which will adequate multiply the number of electrons for readout purposes.

Figure 2:
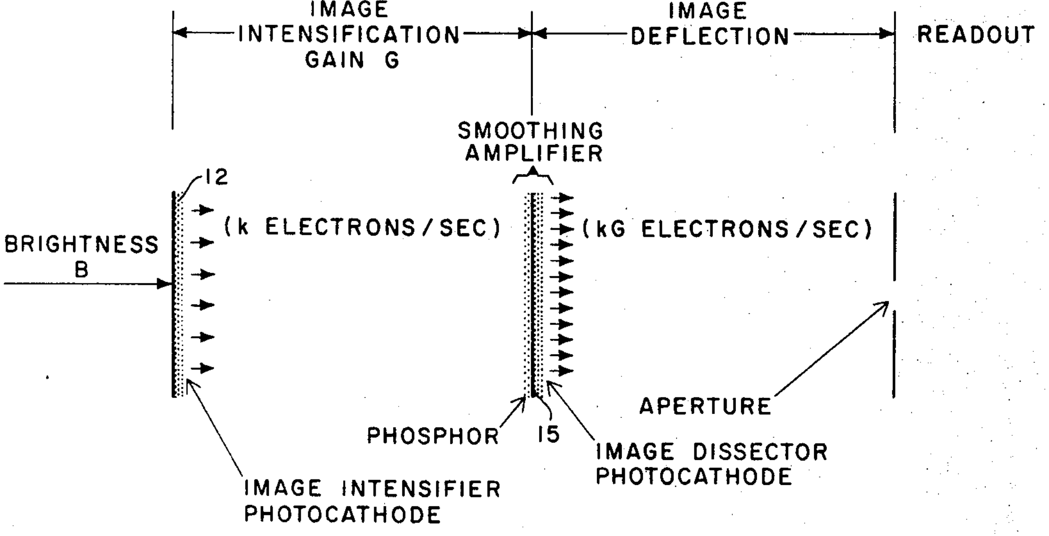
FIG. 2 is a simplified schematic diagram of the imaging tube, identifying elements of interest for the purpose of analysis of the signal-to-noise ratio attainable with the device.

The signal-to-noise ratio of the scanned imaging tube of this invention is discussed below for the purpose of developing the theoretical attainable signal-to-noise ratio, $S/N$, and to show that this $S/N$ is as high as that attainable from an ideal imaging tube. FIG. 2 is a simplified diagram of the tube with elements of interest identified for this analysis of the $S/N$.

If one spot on the image intensifier photocathode 12 is photon-illuminated at brightness $B_1$, then an average of $k$ electrons per second will be released from that particular spot on the photocathode. This electron release follows a Poisson distribution. The number of electrons released from the particular spot is multiplied in the image intensifier section 14, and the resulting larger number of electrons strike a corresponding spot on the phosphor of smoothing amplifier 15 causing it to emit light (photons) which, in turn, cause the release of electrons from the image dissector photocathode of smoothing amplifier 15. For the purpose of this discussion, the gain G of the image intensifier is defined as the ratio of the number of electrons per second released from the image dissector photocathode to the number of electrons per second released from photocathode 12. This ratio is approximately equal to the photon gain $Gp$, of image intensifier 14, defined as the number of photons released from the phosphor to the number of photons incident on photocathode 12. It is assumed for the moment that the phosphor of the smoothing amplifier has no persistence; that is, it has no delay or storage properties.

The output $S/N$ of photocathode 12 for one spot of uniform brightness is determined by the number of electrons released during the sampling time, $t$. Since the release of electrons from a photocathode follows a Poisson distribution, the signal can be defined as the mean value, $kt$, of the random flow. Then the noise is equal to $\sqrt{kt}$ and the $S/N$ is equal to $\sqrt{kt}$. The number of electrons released from the image dissector photocathode is equal to $k$ multiplied by the gain $Gp$. (The noise contributed by random changes of gain is small if the mean value of G exceeds three, when the error produced by neglecting the contribution is less than 16 percent. Also the conditions for preventing saturation are easily met; hence the mean value of G is independent of current density.) However, since it is assumed that the phosphor reacts instantaneously and that the intensifier contributes no noise of its own, the output $S/N$ of the image dissector photocathode of the smoothing amplifier 15 is identical with the output $S/N$ of photocathode 12.

The electron image obtained by photocathode 12 is scanned over the aperture plate 20 in order to "read out" the signal. Therefore, at any given time electrons representing only one resolution element pass through the aperture 19 and are amplified in the electron multiplier 22. The sampling time due to this process is, thus, equal to $t_d$, the time required for scanning one resolution element. Consequently, the $S/N$ obtainable with this system is given by $$(S/N)_D=\sqrt{kt_d} \quad (1)$$

At first glance this small value compares very unfavorably with the $S/N$ obtainable with an ideal imaging tube, which is closely approximated by some intensifier orthicons, and which is given by $$(S/N)_{IDEAL}=\sqrt{kT} \quad (2)$$

where T is the time required to scan one frame. However, some additional considerations are necessary before drawing any final conclusion regarding the attainable $S/N$ for the scanned imaging tube.

In developing Equation 1, it was assumed that the phosphor has no persistence. In the following discussion, it will be shown that the obtainable $S/N$ will be increased if the output phosphor does have persistence, i.e., if the light output of the phosphor decreases gradually with time (decays) instead of vanishing instantaneously when the electrons striking it cease. The following discussion will be restricted to consideration of phosphors in which the light output decays exponentially with time, although there is some indication that phosphors with non-exponential decay characteristics may become available. Phosphors of the latter type which, during a certain time interval after excitation, continue to release light at a rather high level, and then cease rather rapidly would give even better results than the exponential phosphors assumed here.

As stated initially, the release of electrons from photocathode 12 follows a Poisson distribution. Each electron released from photocathode 12 will cause the impact of a large number of electrons at the phosphor, which will be able to release G electrons from the image dissector photocathode. The electrons in each group impacting on the phosphor are, therefore, dependent solely upon the one independent electron which triggered them. During an interval $\Delta t$, the number of these independent events (electrons released from photocathode) is equal to $k\Delta t$. The electrons resulting from just this number of independent events will result in the emission of light from the phosphor, the intensity of which decreases exponentially with time. Thus, at a given time, the phosphor will have effectively stored energy from the immediately preceding interval, $\Delta t$, in an amount $S_0$ where:

$$S_0=k\Delta t \quad (3)$$

The phosphor will also have stored energy from the next-preceding interval corresponding to the number, $S_1$, of independent events occurring during that interval. However, some of this energy will have been subsequently released as light energy, hence, the energy remaining will be:

$$S_1=k\Delta t \exp(-\Delta t/\tau) \quad (4)$$

(If exponential decay is assumed, the phosphor persistence time constant, $\tau$, is defined as the time required for the light output to decrease to a level that is 37 percent of its initial value.) The phosphor will also have stored energy from all other preceding intervals corresponding to the number, $S_x$, of independent events:

$$S_x=k\Delta t \exp(-x\Delta t/\tau) \quad (5)$$

Each interval contains a certain number of independent events. The number of such events in any interval is also independent of the number of events in the other intervals. However, summation of these Poisson distributions will also be a Poisson distribution.

In order to compute the total energy, S, stored in the phosphor, it is only necessary to sum all the terms from all intervals from $-\infty$ to 0, as the interval $\Delta t$ approaches zero.

Hence:

$$S=\lim_{\Delta t\to 0}(S_0+S_1+S_2 \ldots S_\infty) \quad (6)$$

Making use of Equations 3, 4 and 5, we obtain $$S=\lim_{\Delta t\to 0}[k\Delta t+k\Delta t\exp(-\Delta t/\tau)+ k\Delta t\exp(-2\Delta t/\tau)+\ldots]= \lim_{\Delta t\to 0}\{k\Delta t[1+\exp(-2\Delta t/\tau)+\ldots]\} \quad (7)$$

Since $$1+a+a^2+a^3+\ldots=\frac{1}{1-a}$$

it follows that $$S=\lim_{\Delta t\to 0}\frac{k\Delta t}{1-\exp(-\Delta t/\tau} \quad (8)$$

and using L'Hospital's Rule, $$S=\lim_{\Delta t\to 0}\frac{k}{-(-1/\tau)\exp(-\Delta t/\tau)} \quad (9)$$

$$=k\tau \quad (10)$$

N, the standard deviation of S, is, for a Poisson distribution:

$$N=\sqrt{k\tau} \quad (11)$$

Each event (the release of one electron from photocathode 12) will cause G dependent events (i.e., release of electrons from the image dissector photocathode). Therefore, the total number of electrons released from the image dissector photocathode is $$S'=Gk\tau \quad (12)$$

and the standard deviation is $$N'=G\sqrt{k\tau} \quad (13)$$

$$N'=G\sqrt{k\tau} \quad (13)$$

The $S/N$ for one resolution element at the image dissector photocathode is then given by $$(S/N)_{ID}=\frac{Gk\tau}{G\sqrt{k\tau}}=\sqrt{k\tau} \quad (14)$$

If the persistence time constant, $\tau$, of the phosphor is made equal to the frame time of the television system (i.e., the time, T, required to scan all resolution elements), then $$(S/N)_{ID}=\sqrt{kT} \quad (15)$$

A comparison of Equation 15 with Equation 2 shows that Equation 15 gives the $S/N$ obtainable with the ideal imaging tube. Thus, far, however, no consideration has been given the image dissector readout, which may add noise. As noted previously, electrons from only one resolution element of the image dissector photocathode are received by the image dissector aperture 19 at any given instant. Therefore, it is necessary to compute the number of electrons received from the image dissector photocathode during the resolution element readout time interval, $t$.

Just prior to readout, sufficient energy is stored in the phosphor to release S′ electrons from the image dissector photocathode. As stated above, the release follows an exponential function; hence, assuming that no more electrons are received, S′ may be represented by $$S'=A\int_0^\infty \exp(-t/\tau)dt \quad (16)$$

In order to obtain A in this equation, it is necessary, first, to evaluate the integral; thus:

$$S'=A[-\tau\exp(-t/\tau)]_0^\infty=A\tau \quad (17)$$

And then, using Equation 12, $$A=Gk \quad (18)$$

Hence, the number of electrons released from the image dissector photocathode between the times 0 and $t$ is $$S_t'=Gk\int_0^t \exp(-t/\tau)dt \quad (19)$$

$$S_t'=Gk[-\tau\exp(-t/\tau)]_0^t =Gk\tau[1-\exp(-t/\tau)]$$

For this case in which $t<<\tau$ (that is, the storage time constant, $\tau$, is much longer than the time required to read out one resolution element) it is possible to use the approximation $$1-\exp(-X)\approx X$$

and to obtain $$S_t'=Gk\tau(t/\tau)=Gkt \quad (20)$$

If the readout device were the only source of signal fluctuations in the system, then the noise would be $Gkt$ and the obtainable $S/N$ would be $$S/N=\sqrt{Gkt} \quad (21)$$

However, account must also be taken of the previously determined fluctuations from photocathode which, as shown in Equation 15, will cause an $S/N$ of $$(S/N)=\sqrt{kT} \quad (15)$$

If the $S/N$ due to the readout is made large in comparison to that due to photocathode, the resulting system will be one whose $S/N$ is largely determined by the fluctuations due to the input signal averaged in the phosphor.

It is necessary that $$\sqrt{Gkt} >> \sqrt{kT} \quad (22)$$

or that $$G >> T/t \quad (23)$$

In a conventional television system, $T \approx 33$ milliseconds, while $t \approx 125$ nanoseconds. The ratio $T/t$ is, thus, approximately $= 2.6 \times 10^5$. Therefore, to satisfy the above requirement a gain, G, of at least $10^6$ is required to obtain results comparable to those obtainable with image intensifier orthicons and similar devices. At the same time, it should be noted that these devices will also fall short of ideal performance as a result of beam noise, etc. Therefore, a smoothing imaging tube of the type described here which has a $S/N$ which is as good as that of the best present-day conventional imaging tubes is possible.

Obviously many modifications and variations of the present invention are possible in the light of the above teachings. It is therefore to be understood that within the scope of the appended claims the invention may be practiced otherwise than as specifically described.

What is claimed is:

1. A low-light-level scanned imaging tube for converting a two-dimensional image into a time varying electrical signal by scanning a succession of individual image elements, comprising:

(a) a tube housing having transparent input and electrical readouts, (b) a photocathode means mounted at the input end of said tube, said photocathode emitting electrons from each small element of area thereof in proportion to the number of photons impinging upon the area, (c) an image intensifier means positioned following said photocathode means for multiplying the number of electrons emitted from the photocathode means, (d) a smoothing amplifier means for continuous reception, storage and smoothing of groups of impinging electrons from said image intensifier means and which provides diminishing storage that continuously emits electrons over a period of time without dependence upon external cycling voltages, (e) readout means, (f) focusing means for focusing electrons emitted from said smoothing amplifier and projecting them upon said readout means, (g) deflection means for moving the focused electron image across said readout means for sampling various portions thereof, (h) an output anode to which is fed electron energy from the readout means for being applied to an output video circuit.

2. A device as in claim 1 wherein said readout means has at least one aperture for sampling the electron image.

3. A device as in claim 1 wherein said readout means is the image dissector type utilizing multiple apertures thus permitting data processing operations directly by means of changing the scan pattern randomly.

4. A device as in claim 1 wherein said smoothing amplifier comprises a layer of phosphor material adjacent a photoemissive surface, said phosphor material continuing to glow for an appreciable but short time after being excited, light energy from said phosphor when excited causing electrons to be emitted from said photosensitive surface.

References Cited

UNITED STATES PATENTS

| | | | |
|---|---|---|---|
| 2,213,173 | 8/1940 | Rose | 313—67 |
| 2,765,422 | 10/1956 | Henderson | 315—11 |
| 3,062,962 | 11/1962 | McGee | 250—213 |

JAMES W. LAWRENCE, *Primary Examiner.*

V. LAFRANCHI, *Assistant Examiner.*